(12) United States Patent
Saito et al.

(10) Patent No.: US 11,598,688 B2
(45) Date of Patent: Mar. 7, 2023

(54) PRESSURE SENSOR WITH INCREASED ABSOLUTE PRESSURE DETECTION

(71) Applicant: NAGANO KEIKI CO., LTD., Tokyo (JP)

(72) Inventors: Takuya Saito, Tokyo (JP); Yuma Yoshida, Tokyo (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 0 days.

(21) Appl. No.: 17/506,351

(22) Filed: Oct. 20, 2021

(65) Prior Publication Data
US 2022/0128423 A1     Apr. 28, 2022

(30) Foreign Application Priority Data

Oct. 23, 2020   (JP) .............................. JP2020-178108

(51) Int. Cl.
  *G01L 19/14*   (2006.01)
  *G01L 19/00*   (2006.01)

(52) U.S. Cl.
  CPC ........ *G01L 19/148* (2013.01); *G01L 19/0038* (2013.01); *G01L 19/0061* (2013.01); *G01L 2019/0053* (2013.01)

(58) Field of Classification Search
  None
  See application file for complete search history.

(56) References Cited

U.S. PATENT DOCUMENTS

| 4,695,817 | A  | * | 9/1987  | Kurtz ................. G01L 19/0654 338/42 |
| 6,474,170 | B1 | * | 11/2002 | Yamagishi ............ G01L 19/147 73/723 |
| 2009/0235752 | A1 | * | 9/2009  | Miyashita ........... G01L 19/0092 73/718 |
| 2020/0166425 | A1 | * | 5/2020  | Kawase ................ G01L 19/142 |

FOREIGN PATENT DOCUMENTS

JP        4885778        2/2012

OTHER PUBLICATIONS

European Search Report dated Mar. 28, 2022, 8 pages.

* cited by examiner

*Primary Examiner* — Brandi N Hopkins
*Assistant Examiner* — Nigel H Plumb
(74) *Attorney, Agent, or Firm* — Rankin, Hill & Clark LLP

(57) ABSTRACT

A pressure sensor includes a cylindrical case defining an inner space in communication with an outer space; a pressure detector provided in the inner space and configured to detect a gauge pressure of a target fluid; an atmospheric pressure detector configured to detect an atmospheric pressure; and an electronic component configured to calculate an absolute pressure of the target fluid on a basis of the gauge pressure and the atmospheric pressure. The absolute pressure is obtained without requiring airtightness of the case between the inner space and the outer space, and thus, there is no requirement for a seal member to be included between the inner space and the outer space.

6 Claims, 4 Drawing Sheets

PRESSURE SENSOR WITH INCREASED ABSOLUTE PRESSURE DETECTION

The entire disclosure of Japanese Patent Application No. 2020-178108 filed Oct. 23, 2020 is expressly incorporated by reference herein.

TECHNICAL FIELD

The present invention relates to a pressure sensor.

BACKGROUND ART

Some of typically known pressure sensors are configured to measure an absolute pressure of a target fluid (see, for instance, Patent Literature 1 (Japanese Patent No. 4885778)).

Patent Literature 1 discloses that a pressure standard chamber is formed in an inner space of a case and a pressure sensor element is housed within the pressure standard chamber. The absolute pressure of the target fluid is thus detectable by the pressure sensor element housed within the pressure standard chamber.

The pressure standard chamber of the pressure sensor disclosed in Patent Literature 1 has to be provided in the inner space of the case in order to detect the absolute pressure by the pressure sensor element. Accordingly, it is necessary to seal a gap between the inner space and an outer space using a seal member in order to ensure airtightness of the inner space. In this case, when, for instance, the seal member is damaged by vibration, impact or the like, airtightness of the inner space cannot be ensured, so that detection accuracy for the absolute pressure by the pressure sensor element possibly deteriorates.

SUMMARY OF THE INVENTION

An object of the invention is to provide a pressure sensor capable of ensuring detection accuracy for the absolute pressure.

A pressure sensor according to an aspect of the invention includes: a case defining an inner space in communication with an outer space; a pressure detector provided in the inner space of the case and configured to detect a gauge pressure of a target fluid; an atmospheric pressure detector configured to detect an atmospheric pressure; and an arithmetic unit configured to calculate an absolute pressure of the target fluid on a basis of the gauge pressure of the target fluid detected by the pressure detector and the atmospheric pressure detected by the atmospheric pressure detector.

In the above aspect of the invention, the pressure detector configured to detect the gauge pressure of the target fluid is provided in the inner space of the case that is in communication with the outer space. The arithmetic unit then calculates the absolute pressure of the target fluid on a basis of the gauge pressure detected by the pressure detector and the atmospheric pressure detected by the atmospheric pressure detector. Accordingly, the absolute pressure of the target fluid can be obtained without requiring airtightness of the inner space by sealing the case with, for instance, a seal member and the like. Thus, it is not necessary to ensure airtightness of the inner space of the case, so that the accuracy of the detected absolute pressure of the target fluid is prevented from being deteriorated by, for instance, damage on the seal member.

In the pressure sensor according to the above aspect of the invention, it is preferable that the atmospheric pressure detector is provided in the inner space of the case.

In the above arrangement, since the atmospheric pressure detector is provided in the inner space of the case, the atmospheric pressure detector is not necessary to be installed in the outer space of the case. Accordingly, the pressure sensor can be installed in a comparatively smaller space.

In the pressure sensor according to the above aspect of the invention, it is preferable that the pressure sensor further includes: a circuit board configured to receive a detection signal outputted by the pressure detector; and a temperature sensor electrically connected with the circuit board and configured to detect a temperature of the pressure detector, in which the arithmetic unit is configured to correct the detected gauge pressure of the target fluid on a basis of the temperature detected by the temperature sensor.

According to the above arrangement, the gauge pressure of the detected target fluid is corrected on a basis of the temperature detected by the temperature sensor. Accordingly, the absolute pressure can be highly accurately calculated even when the target fluid experiences a large temperature change.

In the pressure sensor according to the above aspect of the invention, it is preferable that a heat insulation layer is provided between the target fluid and the atmospheric pressure detector.

According to the above arrangement, the heat insulation layer is formed between the target fluid and the atmospheric pressure detector. Accordingly, the heat of the target fluid is restrained from being transmitted to the atmospheric pressure detector. Thus, the detection of the atmospheric pressure by the atmospheric pressure detector is less likely to be influenced by the heat of the target fluid, so that the absolute pressure can be highly accurately calculated.

In the pressure sensor according to the above aspect of the invention, it is preferable that the pressure sensor further includes: a sensor module including a cylindrical portion, into which the target fluid is introduced, and a diaphragm provided at an end of the cylindrical portion, the diaphragm including a first surface in contact with the target fluid and a second surface opposite the first surface, the pressure detector being provided on the second surface; a joint being attached with the sensor module and including a pressure inlet configured to introduce the target fluid into the sensor module; and a hollow cylindrical base member being attached to the joint and surrounding the sensor module, in which the temperature sensor includes a temperature detector configured to detect a temperature and a lead wire electrically connecting the temperature detector and the circuit board, and the base member is provided with a receiver configured to receive the temperature detector and the lead wire.

According to the above arrangement, the temperature detector of the temperature sensor is received in the receiver of the hollow cylindrical base member surrounding the circumference of the sensor module provided with the pressure detector. The temperature detector can be thus arranged near the sensor module on a side of the sensor module opposite to a side thereof where the target fluid is introduced, that is, on a side where the pressure detector is provided. Accordingly, for instance, even when the temperature of the target fluid is high, the temperature detector, which is cooled by ambient air in the same manner as the pressure detector, can accurately measure the temperature of the pressure detector. An appropriate temperature correction can thus be applied on the pressure of the target fluid detected by the pressure detector.

Further, the temperature detector and the lead wire can be received in the receiver of the base member. Accordingly, it is not necessary to provide a receiver for the temperature detector and the lead wire in the joint in order to install the temperature detector and the lead wire, thereby facilitating the production of the joint. It should be noted that the receiver for receiving the temperature detector and the lead wire can be easily formed by producing the base member with, for instance, a resin material or the like.

DESCRIPTION OF EMBODIMENT(S)

Exemplary Embodiment

An exemplary embodiment of the invention will be described below with reference to the attached drawings.

Figure 1:
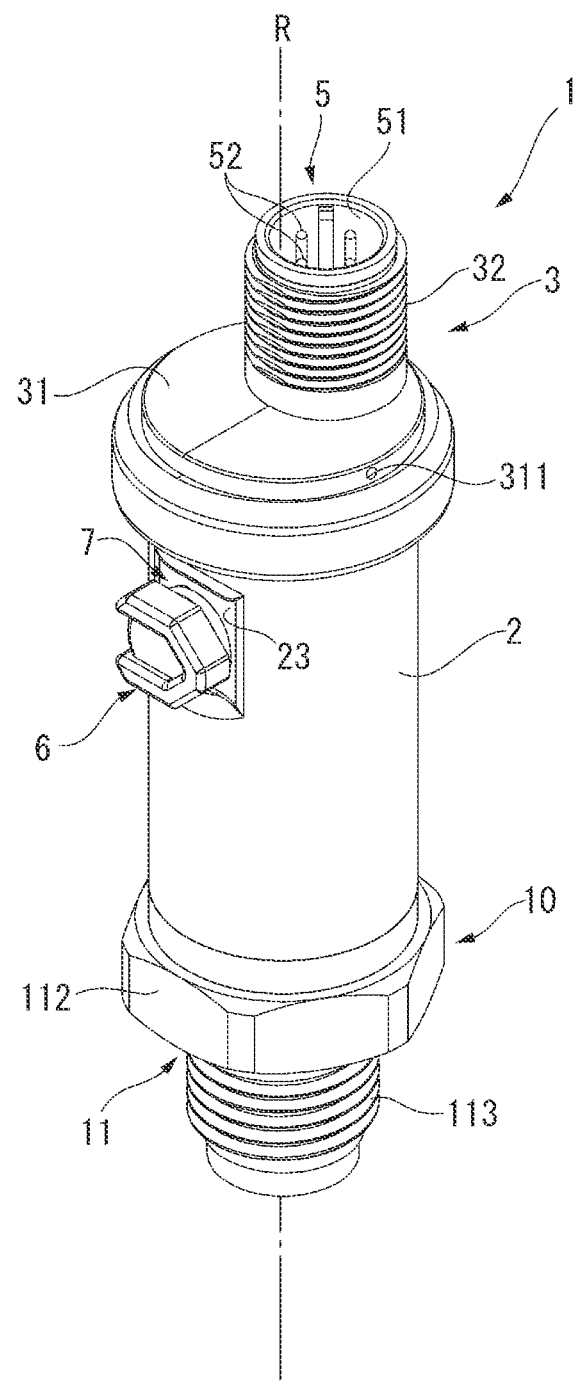
FIG. 1 is a perspective view showing an outline of a pressure sensor according to an exemplary embodiment of the invention.
Figure 2:
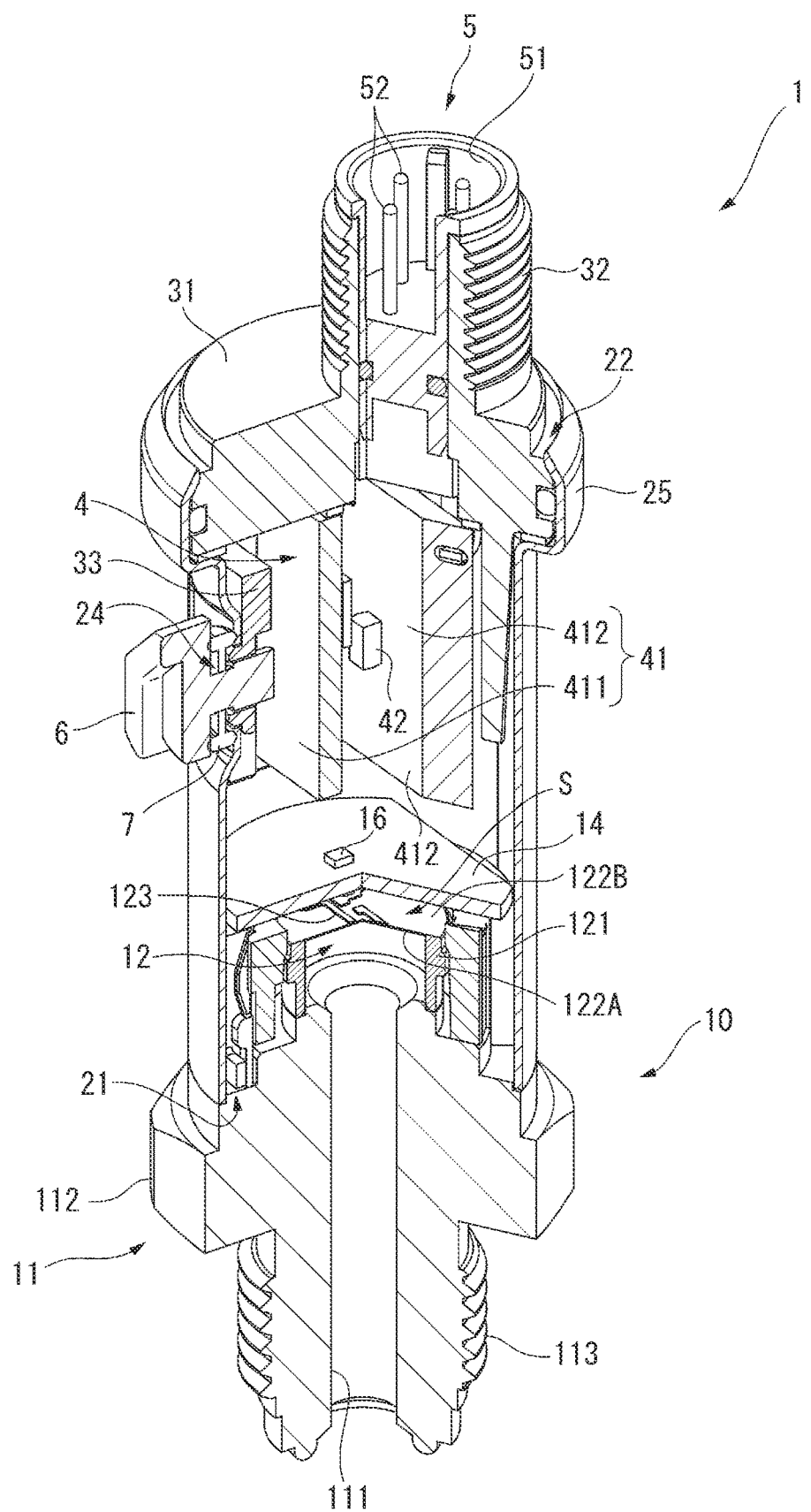
FIG. 2 is a partial cutaway perspective view showing the pressure sensor according to the exemplary embodiment.

FIG. 1 is a perspective view showing an outline of a pressure sensor 1 according to the present exemplary embodiment. FIG. 2 is a partial cutaway perspective view of the pressure sensor 1.

As shown in FIGS. 1 and 2, the pressure sensor 1 includes a cylindrical case 2, a lid member 3, a circuit board 4, a signal transmitter 5, a cap member 6, an intervening member 7, and a sensor assembly 10.

Cylindrical Case 2

The cylindrical case 2, which is a metallic component in a form of a hollow cylinder, includes a first opening 21 and a second opening 22 at a first end and a second end, respectively, in a direction along a center axis R. An inner space of the cylindrical case 2 is in communication with an outer space through an air vent 311 provided in the lid member 3 (described later). In other words, the cylindrical case 2 is an example of a case of the invention.

A circumferential surface of the cylindrical case 2 is provided with a recess 23 formed by recessing a part of the cylindrical case 2. A through-hole 24 is formed in a bottom face of the recess 23 of the cylindrical case 2. In other words, the through-hole 24 is provided in the circumferential surface of the cylindrical case 2.

A fitting ring 25, into which the lid member 3 is fitted, is provided to the second opening 22.

Lid Member 3

The lid member 3, which is a so-called connector member made of a resin, includes a lid body 31, a cylindrical portion 32, and a to-be-attached portion 33.

The lid body 31 is a disc-shaped component that is attached to the cylindrical case 2 by crimping the fitting ring 25. The air vent 311, which brings the inner space of the cylindrical case 2 into communication with the outer space, is provided on a side face of the lid body 31. A communication hole (not shown) in communication with the cylindrical portion 32 is provided in a bottom face of the lid body 31.

An inner circumferential surface of the cylindrical portion 32 defines an attachment hole for receiving the signal transmitter 5. An outer circumferential surface of the cylindrical portion 32 is provided with an external thread.

The to-be-attached portion 33 is a component to which the cap member 6 is detachably attached.

It should be noted that the lid member 3 is not necessarily configured as described above but is optionally, for instance, a terminal box component provided with a terminal block or a component capable of wireless output.

Circuit Board 4

The circuit board 4 includes a board body 41 and an electronic component 42 provided on the board body 41.

The board body 41, which is a rectangular plate-shaped component (in a plan view) whose longitudinal direction extends along the center axis R of the cylindrical case 2, is provided with a wiring pattern (not shown) and the like on a front side thereof.

In the present exemplary embodiment, the board body 41 includes a first board 411 and a second board 412 that are arranged mutually in parallel. The first board 411 and the second board 412 are held by a holder (not shown). It should be noted that the board body 41 is not necessarily configured as described above. For instance, the board body 41 is optionally provided by a single board or, alternatively, three or more boards.

The electronic component 42, which includes a so-called CPU (Central Processing Unit), is provided on the second board 412. Further, the electronic component 42 is electrically connected with a later-described electronic circuit 14 of the sensor assembly 10 through wiring and the like (not shown). The electronic component 42 is thus configured to receive detection signals from the sensor assembly 10.

Signal Transmitter 5

The signal transmitter 5 includes a cylindrical member 51 and a terminal 52.

The cylindrical member 51 is installed on an inner circumference of the cylindrical portion 32 of the lid member 3.

A plurality of terminals 52 are provided inside the cylindrical member 51. In the present exemplary embodiment, four terminals 52 are provided. It should be noted that the terminal 52 is not necessarily configured as described above. For instance, a single terminal 52 or, alternatively, five or more terminals 52 are optionally provided.

Further, the terminal 52 is electrically connected with the electronic component 42 of the circuit board 4 via wiring (not shown) and the like. The terminal 52 is thus electrically connected with the electronic circuit 14 of the sensor assembly 10 (described later) via the electronic component 42.

It should be noted that the cylindrical member 51 is not necessarily in a form of the hollow cylinder but is optionally in a form of a polygonal pipe (e.g. a quadrangular pipe and a hexagonal pipe).

Cap Member 6

The cap member 6 is a resin-made component that is attached to cover the through-hole 24. In the present exemplary embodiment, the cap member 6 is detachably attached to the to-be-attached portion 33 of the lid member 3, as described above.

Intervening Member 7

The intervening member 7 is a component interposed between the through-hole 24 of the cylindrical case 2 and the cap member 6. In the present exemplary embodiment, the intervening member 7 is a component made of rubber or an elastic synthetic resin and attached to the cap member 6.

It should be noted that, though the intervening member 7 is interposed between the through-hole 24 and the cap member 6 in the present exemplary embodiment, the inner space of the cylindrical case 2 is not airtight because the inner space of the cylindrical case 2 is in communication with the outer space through the air vent 311.

Sensor Assembly 10

Figure 3:
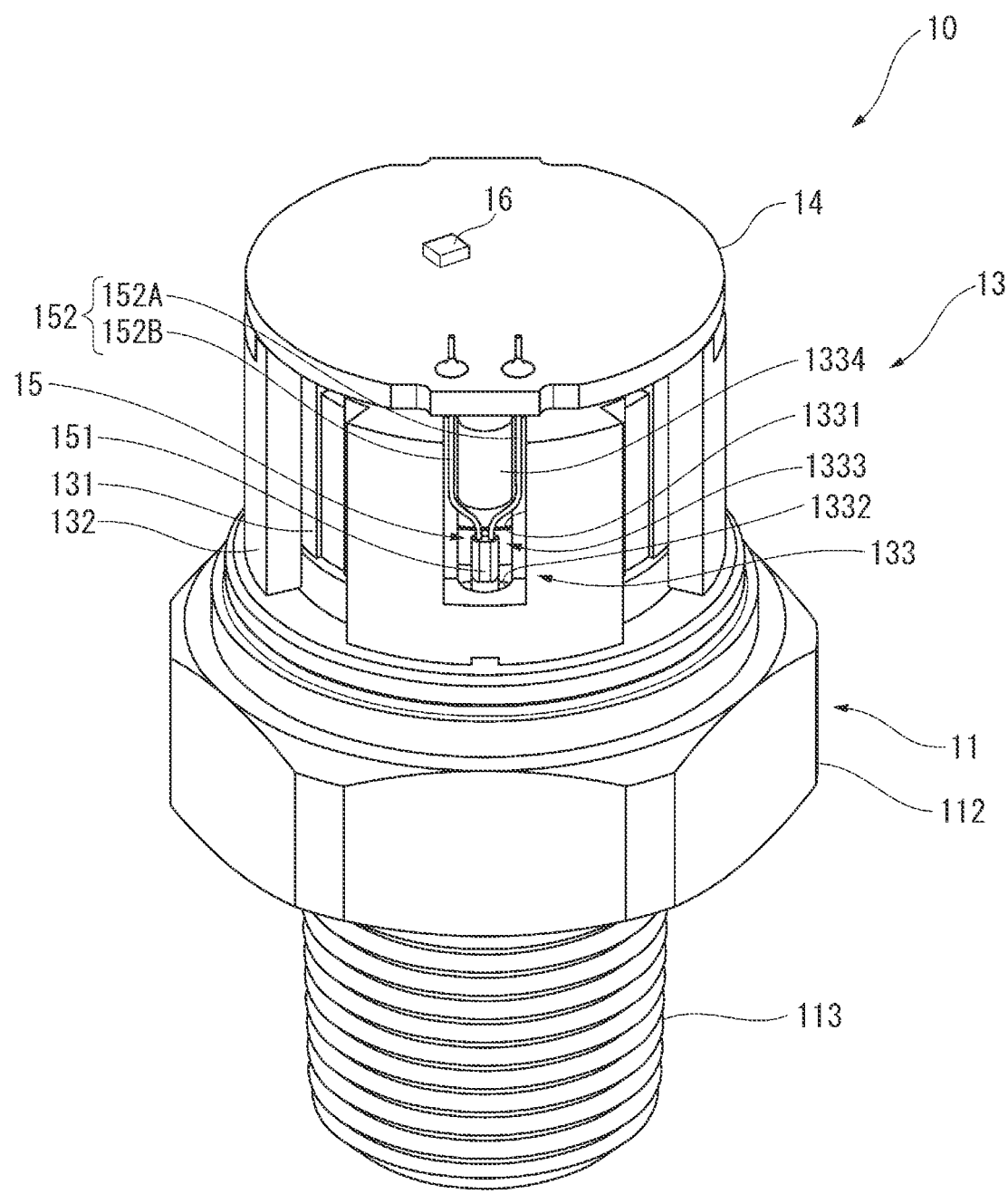
FIG. 3 is a perspective view showing an outline of a sensor assembly.
Figure 4:
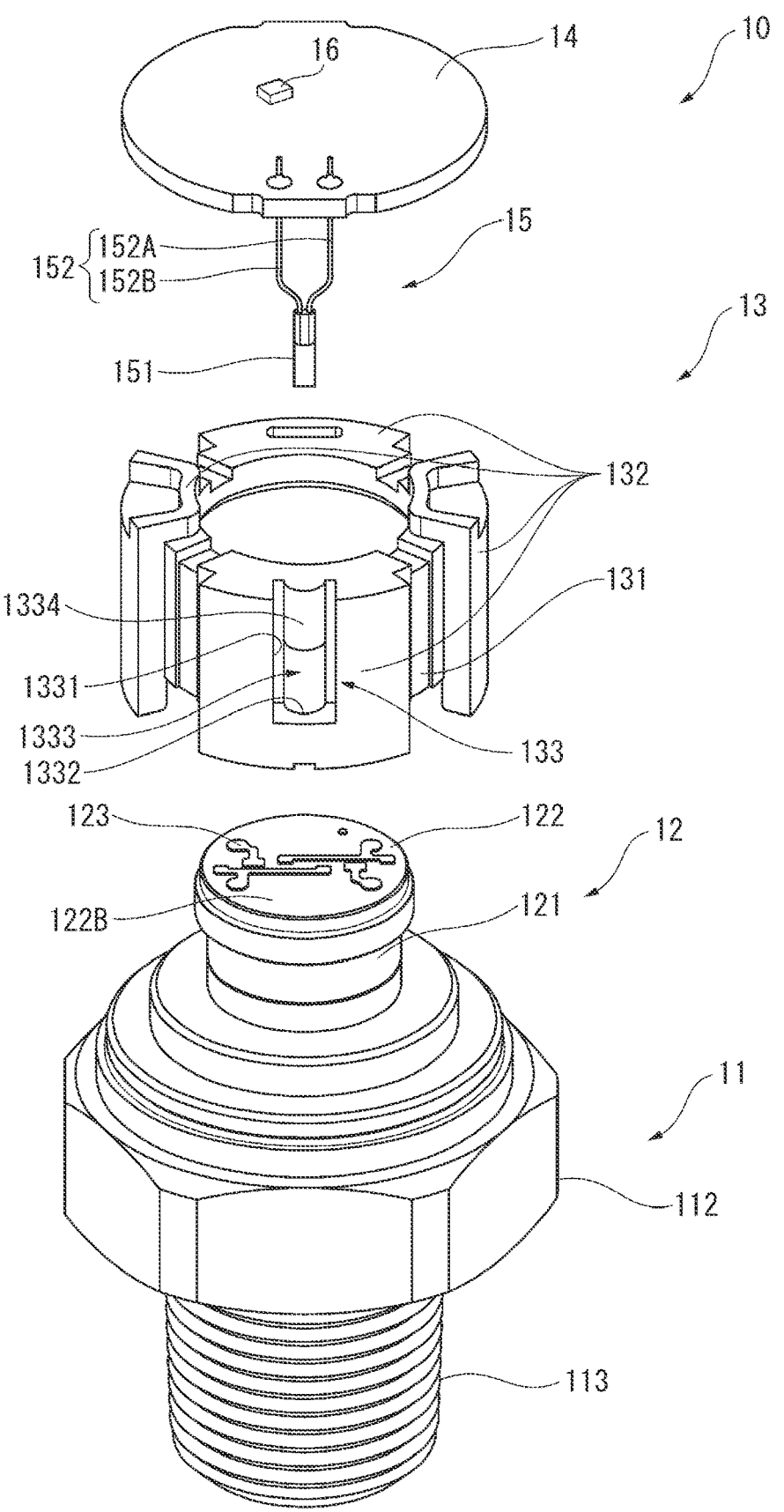
FIG. 4 is an exploded perspective view showing an outline of the sensor assembly.

FIG. 3 is a perspective view showing an outline of the sensor assembly 10. FIG. 4 is an exploded perspective view showing the outline of the sensor assembly 10.

As shown in FIGS. 2 to 4, the sensor assembly 10, which includes a joint 11, a sensor module 12, a base member 13, the electronic circuit 14, a temperature sensor 15, and an atmospheric pressure detector 16, is attached to the cylindrical case 2.

Joint 11

The joint 11 is a metallic component attached to the cylindrical case 2 to cover the first opening 21 of the cylindrical case 2. In the present exemplary embodiment, the joint 11 is connected by welding to an end at the first opening 21 of the cylindrical case 2. It should be noted that the joint 11 is not necessarily welded to the cylindrical case 2 but is optionally screwed to the cylindrical case 2 to be attached.

The joint 11 is provided with a pressure inlet 111 for introducing a measurement target fluid. A first end of the joint 11 radially extends from the center to form a tool engagement portion 112 to be engaged with a tool (e.g. a wrench). An external thread 113 to be screwed to an attachment target (not shown) is formed at a second end of the joint 11.

It should be noted that the second end of the joint 11, which is provided with the external thread 113 in the present exemplary embodiment, is optionally provided with, for instance, an internal thread. Further, the second end of the joint 11 is optionally configured to be welded to be attached to the attachment target or, alternatively, optionally configured to be fitted into the attachment target via an O-ring or the like.

Sensor Module 12

The sensor module 12 is a metallic component including a cylindrical portion 121, a diaphragm 122, and a pressure detector 123.

The cylindrical portion 121 is attached to the first end of the joint 11. The cylindrical portion 121 is in communication with the pressure inlet 111 of the joint 11, through which the target fluid is introduced.

The diaphragm 122, which is integrally provided at an end of the cylindrical portion 121, includes a first surface 122A to be brought into contact with the target fluid and a second surface 122B opposite the first surface 122A.

The pressure detector 123 is provided on the second surface 122B of the diaphragm 122. The pressure detector 123, which is a so-called strain gauge in the present exemplary embodiment, is configured to detect the gauge pressure of the target fluid introduced into the cylindrical portion 121.

It should be noted that the sensor module 12 is not necessarily a metallic component but is optionally a ceramic component.

Base Member 13

The base member 13, which is a synthetic resin component, includes a base member body 131 and a plate portion 132. It should be noted that the base member 13 is not necessarily a synthetic resin component but is optionally a metallic or ceramic component.

The base member body 131, which is a hollow cylindrical body, is arranged surrounding the sensor module 12. It should be noted that the base member body 131 is not necessarily in a form of the hollow cylinder but is optionally in a form of a polygonal pipe (e.g. a quadrangular pipe and a hexagonal pipe).

The plate portion 132 includes four plate portions projecting from a circumferential surface of the base member body 131 in respective four directions. In the present exemplary embodiment, the plate portions 132 are integrally provided with the base member body 131.

One of the four plate portions 132 is provided with a receiver 133 for receiving a temperature detector 151 and a lead wire 152 of the temperature sensor 15 (described later).

The receiver 133 is provided with a groove 1331, a receiver recess 1332, a communication hole 1333, and a projected guide 1334.

The groove 1331, which is provided on an outer circumferential surface of the one of the plate portions 132, receives the lead wire 152 of the later-described temperature sensor 15. The projected guide 1334 is provided at the center of the groove 1331.

The receiver recess 1332 is provided on an inner circumferential surface of the plate portion 132. The temperature detector 151 of the later-described temperature sensor 15 is received in the receiver recess 1332. In other words, the receiver 133 is configured to receive the temperature detector 151 and the lead wire 152 of the temperature sensor 15 in the groove 1331 and the receiver recess 1332.

The communication hole 1333 is provided in the groove 1331 to penetrate through (i.e. connecting inner circumferential surface and outer circumferential surface of) the base member body 131 and the plate portion 132. The temperature sensor 15 thus can be installed across the inner and outer circumferential surfaces of the base member body 131 and the plate portion 132.

Electronic Circuit 14

The electronic circuit 14, which is a disc-shaped component, is provided to a first end of the base member 13 to cover the diaphragm 122 of the sensor module 12. The electronic circuit 14 is provided with a wiring pattern (not shown). The temperature sensor 15 is electrically connected to the electronic circuit 14. Further, the electronic circuit 14 is electrically connected with the sensor module 12 and the circuit board 4 via wiring (not shown) and the like. The detection signal inputted from the sensor module 12 and the temperature sensor 15 can be thus outputted to the electronic component 42 of the circuit board 4.

Further, in the present exemplary embodiment, the atmospheric pressure detector 16 is installed on a surface of the electronic circuit 14 opposite to the surface facing the diaphragm 122. The electronic circuit 14 is configured to output a detection signal inputted from the atmospheric pressure detector 16 to the electronic component 42 of the circuit board 4.

Additionally, the electronic circuit 14 is electrically connectable to an external device without involving the circuit board 4. Accordingly, the sensor assembly 10 before being installed in the pressure sensor 1 (i.e. the sensor assembly 10 by itself) can output the detection signals of the sensor module 12 and the temperature sensor 15 to the external device. The sensor assembly 10 can thus be stored after applying temperature correction and checking temperature characteristics using the external device.

Temperature Sensor 15

The temperature sensor 15 includes the temperature detector 151 and the lead wire 152.

The temperature detector 151, which is provided by a so-called resistance temperature detector, is received in the receiver recess 1332 to be located close to the inner circumferential surface of the base member 13 (i.e. near the sensor module 12). The temperature detector 151 is thus disposed at a side of the sensor module 12 without being subjected to the target fluid (i.e. the side provided with the pressure detector 123) and near the sensor module 12. Accordingly, for instance, even when the temperature of the target fluid is high, the temperature detector 151, which is cooled by ambient air in the same manner as the pressure detector 123, can accurately measure the temperature of the pressure detector 123. It should be noted that the temperature detector 151 is not necessarily provided by a resistance temperature detector but is optionally configured in any manner as long as the temperature detector 151 can measure the temperature.

The lead wire 152, which electrically connects the temperature detector 151 and the electronic circuit 14, includes a first lead wire 152A and a second lead wire 152B. The first lead wire 152A and the second lead wire 152B are oppositely disposed in the groove 1331 of the receiver 133 across the projected guide 1334. The first lead wire 152A and the second lead wire 152B, which thus are not in contact with each other, do not short-circuit even without any insulation treatment (e.g. coating).

Atmospheric Pressure Detector 16

The atmospheric pressure detector 16, which is a so-called barometric sensor, is installed on the side of the electronic circuit 14 opposite the side facing the diaphragm 122. In other words, the atmospheric pressure detector 16, which is installed in the inner space of the cylindrical case 2, is configured to detect the atmospheric pressure of the inner space of the cylindrical case 2.

Further, the atmospheric pressure detector 16 is electrically connected with the electronic circuit 14. The detection signal of the atmospheric pressure detector 16 thus can be outputted to the electronic component 42 of the circuit board 4 via the electronic circuit 14, as described above.

It should be noted that the atmospheric pressure detector 16 is not necessarily configured as described above but is optionally an electrostatic capacitive, membrane, or MEMS barometric sensor. In other words, the atmospheric pressure detector 16 is optionally configured in any manner as long as the atmospheric pressure detector 16 can detect the atmospheric pressure of the inner space of the cylindrical case 2.

Calculation Method of Absolute Pressure of Target Fluid

Next, a calculation method of the absolute pressure of the target fluid will be described below.

As described above, the detection signal detected by the pressure detector 123 (i.e. the detection signal in accordance with the gauge pressure of the target fluid) is inputted to the electronic component 42 of the circuit board 4 via the electronic circuit 14. Similarly, the detection signal detected by the temperature sensor 15 and the detection signal detected by the atmospheric pressure detector 16 are inputted to the electronic component 42 of the circuit board 4 via the electronic circuit 14.

The electronic component 42 applies temperature correction on the gauge pressure of the target fluid detected by the pressure detector 123 on a basis of the temperature detected by the temperature sensor 15. The electronic component 42 then calculates the absolute pressure of the target fluid on a basis of the temperature-corrected gauge pressure and the atmospheric pressure detected by the atmospheric pressure detector 16. Specifically, the electronic component 42 calculates the absolute pressure of the target fluid by adding the atmospheric pressure to the temperature-corrected gauge pressure. It should be noted that the electronic component 42 defines the arithmetic unit of the invention.

As described above, the atmospheric pressure detector 16 is installed on the side of the electronic circuit 14 opposite the side facing the diaphragm 122. In other words, a space S and the electronic circuit 14 intervene between the atmospheric pressure detector 16 and the diaphragm 122 in contact with the target fluid.

Thus, even when, for instance, the temperature of the target fluid is high, the heat of the target fluid is insulated by the space S and the electronic circuit 14. Accordingly, the influence of the heat of the target fluid applied on the detection of the atmospheric pressure by the atmospheric pressure detector 16 can be reduced.

It should be noted that the space S and the electronic circuit 14 define an example of a heat insulation layer of the invention.

The following advantages can be achieved by the above-described present exemplary embodiment.

(1) In the present exemplary embodiment, the pressure detector 123 configured to detect the gauge pressure of the target fluid is installed in the inner space of the cylindrical case 2 that is in communication with the outer space. The electronic component 42 then calculates the absolute pressure of the target fluid on a basis of the gauge pressure of the target fluid detected by the pressure detector 123 and the atmospheric pressure detected by the atmospheric pressure detector 16. Accordingly, the absolute pressure of the target fluid can be obtained without requiring airtightness of the inner space by sealing the cylindrical case 2 with, for instance, a seal member and the like. Thus, it is not necessary to ensure airtightness of the inner space of the cylindrical case 2, so that the accuracy of the detected absolute pressure of the target fluid is prevented from being deteriorated by, for instance, damage on the seal member.

(2) In the present exemplary embodiment, since the atmospheric pressure detector 16 is installed in the inner space of the cylindrical case 2, it is not necessary to install the atmospheric pressure detector 16 in the outer space of the cylindrical case 2. Accordingly, the pressure sensor 1 can be installed in a comparatively smaller space.

(3) The present exemplary embodiment, in which the gauge pressure of the detected target fluid is corrected on a basis of the temperature detected by the temperature sensor 15, can highly accurately calculate the absolute pressure even when the target fluid experiences a large temperature change.

(4) In the present exemplary embodiment, the heat insulation layer is formed between the target fluid and atmospheric pressure detector 16, so that the heat of the target fluid is restrained from being transmitted to the atmospheric pressure detector 16. The influence of the heat of the target fluid applied on the detection of the atmospheric pressure by the atmospheric pressure detector 16 can thus be reduced. Accordingly, the absolute pressure can be highly accurately calculated.

(5) In the present exemplary embodiment, the temperature detector 151 of the temperature sensor 15 is received in the receiver 133 of the hollow cylindrical base member 13 surrounding the sensor module 12 provided with the pressure detector 123. The temperature detector 151 can be thus arranged near the sensor module 12 on a side of the sensor module 12 opposite to a side thereof where the target fluid is introduced, that is, on a side where the pressure detector 123 is provided. Accordingly, for instance, even when the temperature of the target fluid is high, the temperature detector 151, which is cooled by ambient air in the same manner as the pressure detector 123, can accurately measure the temperature of the pressure detector 123. An appropriate temperature correction can thus be applied on the pressure of the target fluid detected by the pressure detector 123.

Further, the temperature detector 151 and the lead wire 152 can be received in the receiver 133 of the base member 13, so that it is not necessary to provide a receiver for the temperature detector 151 and the lead wire 152 in the joint 11 in order to install the temperature detector 151 and the lead wire 152. Accordingly, the production of the joint 11 can be facilitated.

Modifications

It should be noted that the present invention is not limited to the above-described embodiments but includes modifications, improvements, and the like as long as an object of the invention can be achieved.

The atmospheric pressure detector 16, which is installed in the inner space of the cylindrical case 2 in the above-described exemplary embodiment, is not necessarily arranged as in the exemplary embodiment. For instance, the atmospheric pressure detector is optionally installed in an external device outside the cylindrical case 2 or the like and is optionally electrically connected with the electronic component via the signal transmitter, in some embodiments.

In the above-described exemplary embodiment, the sensor assembly 10 is provided with the temperature sensor 15 and the electronic component 42 is configured to correct the gauge pressure on a basis of the temperature detected by the temperature sensor 15. However, the sensor assembly is not necessarily configured as in the exemplary embodiment. For instance, the temperature sensor is optionally not provided in the sensor assembly when there is only a small temperature change in the target fluid. With this arrangement, the absolute pressure can be highly accurately calculated without conducting the temperature correction by the electronic component.

The atmospheric pressure detector 16, which is installed on the electronic circuit 14 in the above-described exemplary embodiment, is not necessarily arranged as in the exemplary embodiment. For instance, the atmospheric pressure detector is installed on the circuit board provided with the electronic component in some embodiments. In this arrangement, the heat insulation layer is provided by the space between the diaphragm and the electronic circuit, the electronic circuit, the space between the electronic circuit and the circuit board, and the like.

The projected guide 1334, which is provided in the groove 1331 of the base member 13 in the above-described exemplary embodiment, is not necessarily configured as in the exemplary embodiment. For instance, guide grooves corresponding to the first lead wire and the second lead wire are provided in some embodiments.

In the above-described exemplary embodiment, the base member 13 is provided with the four plate portions 132 projecting from the circumferential surface of the base member body 131 in four respective directions, one of the plate portions 132 being provided with the receiver 133. However, the base member 13 is not necessarily configured as in the exemplary embodiment. For instance, the base member 13 is optionally provided with a single plate portion or more than four plate portions. Further, the base member body not provided with the plate portion is encompassed by the scope of the invention. In this arrangement, the receiver is optionally provided on the base member body.

The temperature detector 151 of the temperature sensor 15, which is installed near the sensor module 12 in the above-described exemplary embodiment, is not necessarily arranged as in the exemplary embodiment. For instance, the temperature detector is installed in contact with a side face of the joint or a side face of the cylindrical portion of the sensor module in some embodiments. Further, the scope of the invention also encompasses a temperature detector that is installed slightly spaced apart from the joint and the sensor module.

In the above-described exemplary embodiment, the through-hole 24 is provided in the circumferential surface of the cylindrical case 2. However, the scope of the invention is not limited to such an arrangement. For instance, the scope of the invention also encompasses the cylindrical case not provided with the through-hole in the circumferential surface thereof. In this arrangement, the cap member, which covers the through-hole, and the intervening member are not provided.

In the above-described exemplary embodiment, the inner space of the cylindrical case 2 is in communication with the outer space through the air vent 311 provided in the lid member 3. However, the invention is not limited to such an arrangement. For instance, the inner space is in communication with the outer space through a through-hole formed in a side face of the cylindrical case in some embodiments.

The pressure detector 123, which is in a form of a strain gauge provided on the diaphragm 122 in the above-described exemplary embodiment, is not necessarily configured as in the exemplary embodiment. For instance, the pressure detector is in a form of an electrostatic capacitive detector in some embodiments. In sum, the pressure detector is configured in any manner as long as the pressure detector can detect the gauge pressure of the target fluid.

The cylindrical case 2 and the joint 11, which are in a form of metallic components in the above-described exemplary embodiments, are not necessarily metallic components but are made of synthetic resin(s) in some embodiments.

The cylindrical case 2, which is a hollow cylindrical component in the above exemplary embodiments, is not necessarily cylindrical. For instance, the cylindrical case is a hollow polygonal component in some embodiments.

What is claimed is:

1. A pressure sensor comprising:
   a case;
   a sensor module comprising a diaphragm and a pressure detector configured to detect a gauge pressure of a target fluid;
   an atmospheric pressure detector configured to detect an atmospheric pressure; and
   an arithmetic unit configured to calculate an absolute pressure of the target fluid on a basis of the gauge pressure of the target fluid detected by the pressure detector and the atmospheric pressure detected by the atmospheric pressure detector;
   wherein the case is in the form of a hollow cylinder defining an inner space of the case;
   wherein a lid member is attached to a second end of the case;
   wherein a joint is attached to a first end of the case, and the joint comprises a pressure inlet configured to introduce a target fluid;
   wherein the sensor module is attached to the joint and is provided in the inner space of the case, the sensor module further comprising a cylindrical portion into which the target fluid is, in use, introduced through the pressure inlet, wherein the diaphragm is provided at an end of the cylindrical portion, and the diaphragm comprises a first surface which is configured, in use, to be in contact with the target fluid and a second surface opposite the first surface, wherein the pressure detector is provided on the second surface, and wherein the sensor module further comprises an electronic circuit which covers the diaphragm;

wherein a circuit board is provided in the inner space of the case and is electrically connected with the pressure detector, and is configured to receive a detection signal outputted by the pressure detector, and the circuit board is electrically connected with the atmospheric pressure detector, and wherein the arithmetic unit is provided on the circuit board;

wherein the lid member comprises an air vent configured to bring the inner space of the case into communication with an outer space outside the case and, in use, into communication with an atmosphere at atmospheric pressure, and the atmospheric pressure detector is installed on the electronic circuit or on the circuit board.

2. The pressure sensor according to claim 1, further comprising:

a temperature sensor electrically connected with the circuit board and configured to detect a temperature of the pressure detector, wherein the arithmetic unit is configured to correct the detected gauge pressure of the target fluid on a basis of the temperature detected by the temperature sensor.

3. The pressure sensor according to claim 2, wherein a heat insulation layer is provided between the target fluid and the atmospheric pressure detector.

4. The pressure sensor according to claim 3, further comprising:

a hollow cylindrical base member being attached to the joint and surrounding the sensor module, wherein the temperature sensor comprises a temperature detector configured to detect a temperature and a lead wire electrically connecting the temperature detector and the circuit board, and the base member is provided with a receiver configured to receive the temperature detector and the lead wire.

5. The pressure sensor according to any of claim 1, wherein a terminal of a signal transmitter is installed on the lid member, and the terminal is electrically connected to the arithmetic unit provided on the circuit board.

6. A pressure sensor comprising:

a case;

a sensor module comprising a diaphragm and a pressure detector, the pressure detector being configured to detect a gauge pressure of a target fluid;

an atmospheric pressure detector configured to detect an atmospheric pressure; and an arithmetic unit configured to calculate an absolute pressure of the target fluid on a basis of the gauge pressure of the target fluid detected by the pressure detector and the atmospheric pressure detected by the atmospheric pressure detector;

wherein the case is in the form of a hollow cylinder defining an inner space of the case;

wherein a lid member is attached to a second end of the case;

wherein a joint is attached to a first end of the case, and the joint comprises a pressure inlet configured to introduce a target fluid;

wherein the sensor module is attached to the joint and is provided in the inner space of the case, the sensor module further comprising a cylindrical portion into which the target fluid is, in use, introduced through the pressure inlet, wherein the diaphragm is provided at an end of the cylindrical portion, and the diaphragm comprises a first surface which is configured, in use, to be in contact with the target fluid and a second surface opposite the first surface, wherein the pressure detector is provided on the second surface, and wherein the sensor module further comprises an electronic circuit which covers the diaphragm;

wherein a circuit board is provided in the inner space of the case and is electrically connected with the pressure detector, and is configured to receive a detection signal outputted by the pressure detector, and the circuit board is electrically connected with the atmospheric pressure detector, wherein the arithmetic unit is provided on the circuit board; and wherein the atmospheric pressure detector is installed in an external device outside the case and which is, in use, in an outer space outside the case in an atmosphere at atmospheric pressure.

* * * * *